United States Patent [19]

Pez et al.

[11] Patent Number: 4,762,535

[45] Date of Patent: Aug. 9, 1988

[54] AMMONIA SEPARATION USING SEMIPERMEABLE MEMBRANES

[75] Inventors: Guido P. Pez, Allentown; Daniel V. Laciak, Fogelsville, both of Pa.

[73] Assignee: Air Products and Chemicals, Inc., Allentown, Pa.

[21] Appl. No.: 57,403

[22] Filed: Jun. 2, 1987

[51] Int. Cl.$^4$ ............................................. B01D 53/22
[52] U.S. Cl. ........................................... 55/16; 55/70
[58] Field of Search ..................... 55/16, 70, 74, 158, 55/387; 210/638, 640, 660, 681; 423/237; 521/25

[56] References Cited

U.S. PATENT DOCUMENTS

| | | | |
|---|---|---|---|
| 2,681,319 | 6/1954 | Bodamer | 210/638 X |
| 3,475,330 | 10/1969 | Gilles | 210/681 X |
| 3,545,931 | 12/1970 | McKinley, Jr. | 55/16 X |
| 3,554,905 | 1/1971 | Place et al. | 210/638 |
| 3,723,306 | 3/1973 | Bridgeford | 210/638 |
| 3,948,769 | 4/1976 | Dobbs | 210/681 X |
| 4,125,462 | 11/1978 | Latty | 210/638 |
| 4,156,597 | 5/1979 | Browall | 55/70 X |
| 4,180,553 | 12/1979 | Null et al. | 55/16 X |
| 4,262,041 | 4/1981 | Eguchi et al. | 210/500.42 X |
| 4,439,351 | 3/1984 | Sinha | 423/237 X |
| 4,537,760 | 8/1985 | Lavie | 423/359 |
| 4,547,293 | 10/1985 | King et al. | 210/638 |
| 4,608,060 | 8/1986 | Kulprathipanja et al. | 55/16 |
| 4,661,257 | 4/1987 | Kreevoy et al. | 210/638 |

FOREIGN PATENT DOCUMENTS

| | | |
|---|---|---|
| 86102208.5 | 2/1986 | European Pat. Off. . |
| 790510 | 2/1958 | United Kingdom ................ 423/237 |
| 866723 | 4/1961 | United Kingdom ................ 210/638 |
| 2145702A | 4/1985 | United Kingdom . |
| 1063774A | 12/1983 | U.S.S.R. . |

OTHER PUBLICATIONS

R. D. Rice and J. V. Busa, CEP Oct. 1984, p. 61, "Treating Acid & Sour Gas Recovering NH$_3$ by the PHOSAM-W Process".
Z. Prokop and K. Setinek, J. Polymer Science, Polymer Chem. Ed., vol. 12, 2535–2543, (1974) "Sorption of Gaseous Ammonia on Sulfonated Macroreticular Ion Exchangers".
C. Lochmuller et al., Analytical Letters 18(A4), 423–428 (1985), "Chemically-Modified Ion Exchange Membranes as Sampling Devices for Gas-Phase Ammonia".
Foote and Hunter, J. Am. Chem. Soc., 42, 19(1920) p. 69, "Equilibrium in the System Ammonia-Ammonium Thiocyanate".
Brubaker and Kammermeyer, Ind. Eng. Chem., 46, p. 733 (1954) "Separation of Gases by Plastic Membranes".
Kostrov et al., Plast. Massy., vol. 5, pp. 18–19, (1981) (trans.), "Effect of Ammonia on the Properties of Fluorine-Containing Polymers".
R. M. Barrer et al., J. Chem. Soc., Faraday Trans., 1, 69, 2166 (1973), "Transport of Single Gases and of Binary Gas Mixtures in a Microporous Carbon Membrane".
S. Kamata and M. Tashiro, J. Chem. Soc. Jpn., Ind. Chem. Soc., 73, 1083 (1970).
M. Stainer et al., J. Electrochem. Soc., vol. 131, 789, (1984), "Stoichiometry of Formation and Conductivity Response of Amorphous and Crystalline Complexes Formed Between Poly(Ethylene Oxide) and Ammonium Salts: PEO$_x$.NH$_4$SCN and PEO$_x$.NH$_4$SO$_3$CF$_3$".

*Primary Examiner*—Robert Spitzer
*Attorney, Agent, or Firm*—Mark L. Rodgers; William F. Marsh; James C. Simmons

[57] ABSTRACT

The present invention is a process for separating ammonia from mixtures of other gases or from aqueous streams. The ammonia-containing mixture is contacted with a membrane containing, as the active component, a salt having the structural formula: NR$_4$$^+$X$^-$, wherein each R is independently H or a straight chain or branched alkyl group and X$^-$ is an organic or inorganic anion. The membrane is useful for the selective permeation of ammonia from mixtures of gases containing ammonia, nitrogen and hydrogen.

15 Claims, No Drawings

AMMONIA SEPARATION USING SEMIPERMEABLE MEMBRANES

TECHNICAL FIELD

The present invention relates to the separation of ammonia from mixtures of other gases, or from aqueous streams. More particularly, it relates to processes which use semipermeable membranes that are effective for the selective permeation of ammonia from mixtures of ammonia and other components.

BACKGROUND OF THE INVENTION

There are a number of industrial processes in which it is necessary to separate $NH_3$ from mixtures of other gases, or from aqueous streams. Perhaps the largest scale separation is the removal of $NH_3$ from the gas mixture that is present in the recycle loop of an ammonia synthesis plant. Currently, this separation is accomplished by refrigeration, with ammonia being removed in a liquid state. In other operations, such as in petroleum refineries and other related industries, ammonia is removed by steam stripping. Various attempts have been made to develop an efficient and practical sorption system for the selective removal and recovery of $NH_3$ from various gaseous and aqueous streams.

Alumina silicate zeolites and high surface area carbons, have been widely used as ammonia sorbents. U.S. Pat. No. 4,537,760 and U.K. patent application No. 2145702-A both disclose processes which utilize such sorbents for the separation of $NH_3$ from the mixture of gases present in the recycle loop of an ammonia plant. Additionally, R. D. Rice and J. V. Busa in *Chemical Engineering Processing*, October 1984, page 61 disclosed the use of solutions of ammonium diacid phosphate as selective, reversible sorbents for ammonia.

A number of organic polymer systems have been shown to sorb ammonia from gaseous mixtures. S. Kamata and M. Tashiro, *J. Chem. Soc. Jpn., Ind. Chem. Soc.*, 73 1083 (1970) disclose the use of cation exchange resins in the proton and metal ion forms to take up ammonia with varying degrees of reversibility. It was shown that the $H^+$, $Ni^{II}$, $Cu^{II}$, $Co^{II}$ and $Zn^{II}$ forms of Amberlyst 15 cation exchange resins have an appreciable capacity for $NH_3$. Similarly, Z. Prokop and K. Setinek, *J. Polym. Science, Polym. Chem. Ed.* 12, (11), 2535-43 (1974) disclose the use of cation exchange resins in the ammonium ($NH_4^+$) form for absorption of ammonia. Other known materials which are well suited for ammonia absorption include cellulose acetate, ethyl cellulose, cellulose acetabutyrate and hydroxycelluloses. Recently, C. H. Lochmuller, et al. *Analytical Letters* 18(A)(4) 423 (1985) have reported the use of $Co^{2+}$ ion exchanged Nafion (available in the $Na^+$ form from E. I. DuPont & Company) as a reversible sorbent for $NH_3$. M. Stainer et al, *J. Electrochem Soc.*, 131, 789 (1986) in a paper on the electrical conductivity of complexes formed between poly(ethylene oxide) and ammonium salts incidentally state that a complex, the composition of which is not specified, readily absorbs ammonia.

It was disclosed by H. W. Foote and M. A. Hunter, *J. Am. Chem. Soc.*, 42, 19 (1920) that ammonia can be sorbed by ammonium thiocyanate. It has been known for many years that ammonium nitrate and ammonium thiocyanate deliquesce in the presence of ammonia vapor, yielding very concentrated solutions of these salts in liquid ammonia. Recent studies, using Raman spectroscopy, have shown that there is a strong interaction between $NH_3$ and the sulfur end of the $SCN^-$ ion, although the mechanism of this interaction is not fully understood. Foote and Hunter disclosed the possibility of using ammonium thiocyanate to effect the removal of $NH_3$ from the recycle loop of an $NH_3$ plant, but implementation was not accomplished because of the highly corrosive nature of the ammonia/$NH_4SCN$ solutions towards most metals.

Several membrane-based gas separation technologies for the separation of ammonia from other gases have received limited disclosure in the literature. Most of these are polymeric materials which exhibit poor selectivity for ammonia passage and hence are not well suited for ammonia separation processes. Other difficulties with such polymeric membranes are related to the low absolute permeability of $NH_3$ and the stability of the polymers to $NH_3$ at higher than ambient temperatures.

D. W. Brubaker and K. Kammermeyer, *Ind. Eng. Chem.*, 46, 733 (1954) disclosed the use of a polyethylene film membrane for the separation of $NH_3$ from $N_2$ and $H_2$ in an ammonia synthesis plant. Because of difficulties associated with the low absolute permeability of the film for $NH_3$, and the poor separation factor for $NH_3$ versus $H_2$ and $N_2$, it was felt that the system would not be competitive with the conventional refrigeration methods.

U.S. Pat. No. 3,545,931 discloses the use of a polytetrafluoroethylene membrane for $NH_3$ separation in conjunction with a system which detects and quantifies the concentration of $NH_3$ in aqueous streams. Although actual separation data is not given in the patent, the permeability of the polytetrafluoroethylene membrane towards $NH_3$ is very low, as it is for other gases.

Kostrov, et al., *Plast. Massy, Vol.* 5, pp. 18-19, (1981) found that a vinylidene fluoride-tetrafluoroethylene copolymer membrane exhibited surprisingly high $NH_3$ selectively/permeability properties, especially in relation to the parent homopolymers. The high permeability of ammonia is ascribed to an unspecified reaction between ammonia and the copolymer, which is rendered yellow upon exposure to $NH_3$ gas. It is known that polyvinylidene fluoride is degraded on prolonged contact with aniline, which is a much weaker base than ammonia, at 23° C. and by aqueous NaOH at 120° C. It is, therefore, believed that the above copolymer and its $NH_3$ reaction product would ultimately degrade with usage and, therefore, would not be a viable material for permeating ammonia.

Russian Pat. SU No. 1063774-A references unpublished Russian data on a hydrated cellulose membrane for the separation of $NH_3$ from $H_2$, and claims improved membranes based on aromatic polysulfonamide polymers. Hydrated cellulose has a moderate $NH_3$ permeability and selectivity performance in separating $NH_3$ from $H_2$, but it has a narrow range of usefulness with respect to temperature and pressure of ammonia. Degradation of the membrane is observed at higher temperatures and over extended use. R. M. Barrer, et al., *J. Chem. Soc. Faraday Trans.* 1,69, 2166 (1973) describe the operation of a very selective carbon plug membrane for the separation of $NH_3$ from $N_2$ and $H_2$. The membrane, which relies on the condensation and "surface flow" of $NH_3$ in the microporous carbon, has been shown to operate effectively with an $NH_3/H_2$ selectivity of about 250 at conditions that are near the point of liquefaction of ammonia. Otherwise, the NH₃/H₂ selectivity decreases rapidly at other conditions. Accordingly, it is unlikely that this carbon membrane would be useful for the separation of NH₃ from other gases in the ammonia synthesis loop at the conditions of interest.

Recently S. Kulprathipanja and S. S. Kulkarni have disclosed in U.S. Pat. No. 4,608,060 the preparation of a multicomponent membrane comprising silicone rubber and polyethylene glycol which can separate ammonia from N₂ and H₂. The membrane shows a very high ammonia permeance of $\approx 30 \times 10^{-5}$ cm³(STP)/cm².sec.cmHg, but the NH₃/H₂ separation factor is relatively low ($\approx 80$).

G. P. Pez and R. T. Carlin have described in European Patent Application No. 86102208.5, the achievement of an effective separation of NH₃ from N₂ and H₂ at high temperatures (250°–350° C.) using a membrane consisting of a reversibly ammonia reactive molten salt (e.g., ZnCl₂) immobilized in a porous metallic or ceramic support.

BRIEF SUMMARY OF THE INVENTION

The present invention is a process for separating ammonia from a mixture of gases or liquids containing ammonia and at least one other component by contacting the ammonia-containing mixture with a membrane containing a salt having the structural formula $NR_4^+X^-$ wherein each R is independently H or a straight chain or branched alkyl group and $X^-$ is an organic or inorganic ion, such that said salt selectively and reversibly sorbs ammonia from the mixture. The salt-containing membrane is formed typically by either incorporating the salt into a polymeric structure to form a physical mixture or blend, or by utilizing a solution of the salt in liquid ammonia, which, as a thin film on, or immobilized within a suitable support, functions as the permselective membrane.

The present invention operates by employing a salt which is capable of selectively and reversibly sorbing ammonia from the ammonia-containing mixture while maintaining good stability over a wide range of process conditions. In addition, the ammonia sorbed by the salts is relatively mobile so that the composition can be used for the preparation of ammonia selective permeable membranes. Thus the salts have the flexibility in that they can be physically incorporated into a suitable polymeric structure to form a physical blend which functions as a membrane or can be utilized in ammonia solution as a film, on or contained within a support, to form a membrane.

DETAILED DESCRIPTION OF THE INVENTION

The separation of a component from a mixture of gases, liquids, or vapors can be effected by methods which rely on the selective sorption of the particular component, or, alternatively, by the utilization of semipermeable membranes which are selective to the passage of the selected component. The present invention is a process for separating ammonia from a mixture of gases or liquids containing ammonia and at least one other component, employing novel semipermeable membranes which are effective for the selective permeation of ammonia.

A mixture of gases or liquids containing ammonia and at least one other component is contacted with a membrane containing as the active component a salt having the structural formula:

$$NR_4^+X^-$$

wherein each R is independently H or a straight chain or branched alkyl group and $X^-$ is an organic or inorganic anion. The above described salt, either by itself or in conjunction with an associated polymeric material, selectively and reversibly absorbs ammonia from the ammonia-containing mixture.

The group $X^-$ may be any inorganic anion, such as a nitrate, a halide, or pseudohalide i.e., $TeCN^-$, $SeCN^-$ or $SCN^-$, etc. The expected order of effectiveness with respect to NH₃ sorption capacity of the salt for various inorganic anions is:

$$TeCN^- \approx SeCN^- \geqq SCN^- > I^- > NO_3^- > Br^- > Cl^-.$$

The group $X^-$ may also be an organic anion such as a carboxylate, $R'COO^-$, when $R'$ is H or a hydrocarbon group. For a given anion, the expected order of effectiveness of the various cations is:

$$NH_4^+ > NH_3R^+ > NH_2R_2^+ > NHR_3^+ > NR_4^+,$$

where R is a straight chain or branched alkyl group.

The salt can be obtained in the membrane by a variety of methods and configurations. In accordance with one such configuration, the salt is incorporated into a polymeric structure to form a physical mixture which functions as a gas permeation membrane, which is effective for the permeation of NH₃ vis à via H₂, N₂, etc. In this type of configuration it is preferred that the salt have a structural formula wherein at least one R is H, and more preferred that at least three of the R substituents are H. The polymeric structure into which the salt is incorporated can be any suitable polymer which does not adversely react with the salt or ammonia, with polyvinylalcohol based polymers being well suited for this application. Depending upon the particular polymer used, a polymer pretreatment may be preferred prior to incorporating the salt. For example, when ammonium thiocyanate is incorporated into polyvinylalcohol, it is preferred that the polyvinylalcohol be functionalized with methacrylic acid and cross linked with tetraethylene glycol diacrylate.

Incorporating ammonia-sorbent salts into a polymeric structure typically results in the salt being present as a physical mixture within the polymer although there may be some interaction of $NR_4^+$ and $X^-$ with functional groups on the polymer backbone. Upon exposure to ammonia, these materials sorb NH₃ and swell to form clear gels. The gels, which are apparently homogeneous and consist of the dissolved salt and swollen polymer, surprisingly function as NH₃ separation membranes which exhibit excellent permeation rates for NH₃ with very high selectivities towards NH₃ over other components, especially N₂ and H₂. On the basis of these findings it is evident that any blend of ammoniasorptive ionic salts, such as $NH_4^+SCN^-$, $NH_4NO_3^-$, etc., with relatively polar polymers, such as polyvinylalcohol and derivatives thereof, polyethyleneimine, poly(propylene oxide), polyacrylamide, etc., should function, in a very similar manner, as reversible NH₃ sorbents and according to this invention as described hereinafter, as selective NH₃-permeation membranes.

In addition to incorporating the salt into a polymeric structure to form a physical blend, various other configurations are also available. Examples of such other configurations include imbibing or immobilizing solutions of the salt in liquid ammonia into porous polymers, or encapsulating the salt or liquid $NH_3$ solutions of the salt in a non-porous, gas permeable polymer or polymer blend material. For example, one preferred embodiment would be a porous polymer (either a flat sheet, a spiral wound flat sheet, a porous wall hollow fiber, etc.) impregnated in the porous regions with the salt or an $NH_3$/salt solution and encapsulated by a non-porous, gas permeable polymer or polymer blend. When the salt alone is used, upon exposure of the final fabricated membrane to ammonia, the encapsulated salt would absorb the gas giving the desired encapsulated salt/ammonia solution liquid membrane. Such a membrane would exhibit both good mechanical properties and separation performance.

In a process for separating ammonia from a mixture of gases or liquids containing ammonia and at least one other component the mixture is passed over one side of a membrane (hereinafter called the feed or upstream side) which contains as the active element a salt of the structural formula $NR_4^+X^-$. Ammonia selectively permeates through the membrane and may be recovered at the permeate or downstream side. For the permeation to occur it is necessary to maintain a higher partial pressure (strictly, fugacity) of $NH_3$ at the feed side of the membrane. The required correspondingly lower partial pressure of ammonia at the permeate interface may be realized using a vacuum pump, compressor or inert gas sweep.

The membrane, when used for instance in the separation of ammonia from nitrogen and hydrogen, is believed to function by the following mechanism. At the feed side, ammonia enters the membrane where it is absorbed to either form a solution with an $NR_4^+X^-$ salt or an $NH_3$/polymer gel with a polymer membrane containing an $NR_4^+X^-$ salt. The thus sorbed ammonia diffuses in a concentration gradient within the membrane, toward the permeate interface where it is desorbed into the gas phase and recovered. It is believed that the exceptional ammonia permeance observed arises from a combination of the high concentration and surprisingly favorable diffusivity of ammonia in the membrane material. While such gases as $H_2$ and $N_2$ may be expected to have somewhat greater diffusivities, their solubility in the membrane is far less than that of $NH_3$, (by several orders of magnitude) so that their permeation rates (permeances) through the membrane are relatively low. These considerations serve to explain the high permeances observed for ammonia and the very favorable permselective properties of the membrane for the recovery of ammonia from mixtures containing ammonia, nitrogen and hydrogen.

The present invention is suitable for a wide range of applications, such as for the separation of $NH_3$ from gas streams in the manufacture of acrylonitrile, from $CH_4$, CO, air and HCN in the Andrusow process for the manufacture of HCN and especially from the $NH_3$, $N_2$, $H_2$, $CH_4$, Ar mixture that is present in the recycle loop of an ammonia synthesis plant.

In a typical ammonia plant an approximately 3:1 mixture of hydrogen to nitrogen (with some Ar and $CH_4$) is compressed to about 3000 psi and passed through a catalytic converter resulting in about 13% conversion to ammonia. The product stream is subsequently cooled, typically by refrigeration, to condense most of the $NH_3$ and the remaining $NH_3$, $N_2$, $H_2$ and Ar mixture is reheated and recycled through the reactor.

In an alternative process the ammonia could be recovered by inserting into the recycle loop, a permselective membrane that effectively permeates ammonia while retaining the $H_2$, $N_2$ and Ar in the recycle loop largely at system pressure. By avoiding or reducing the refrigeration step significant savings in power and capital may be achieved. It is desirable that the membrane have both a high permeance for $NH_3$ and very large separation ($\propto$) factors: $\propto(NH_3/H_2)$, and $\propto(NH_3/N_2)$. It is especially desirable that the $\propto(NH_3/H_2)$ selectivity be very large so that $H_2$, which is the most abundant and costly component in the recycle loop, may be largely retained for recycling to the reactor.

The membranes of the present invention provide the required combination of $NH_3$ permeance and $\propto(NH_3/H_2)$ and $\propto(NH_3/N_2)$ separation factors, at near ambient temperatures which is not shown by any of the membranes disclosed in the prior art. This superior performance is illustrated, for instance, by Examples 1 and 2.

Thus, in Example 1 below, which shows the performance of an ammonium thiocyanate in liquid ammonia, liquid membrane immobilized in porous nylon, a very high ammonia permeance is seen ($\approx 200 \times 10^{-5}$ $cm^3/cm^2 \cdot s \cdot cmHg$) with an ammonia to nitrogen selectivity $\propto(NH_3/N_2)$ of about 8700.

Example 2 below illustrates the performance of a modified polyvinylalcohol/ammonium thiocyanate polymer/salt blend membrane. The ammonia permeance was $\approx 18 \times 10^{-5}$ $cm^3/cm^2 \cdot s \cdot cmHg$ with values of $\propto(NH_3/N_2)$ ranging from 1000 to 3000. It is expected that the $\propto(NH_3/H_2)$ selectivity for these two membranes will also be very high i.e.; >1000.

EXPERIMENTAL

A. Membrane Performance Measurements

The various supported thin composite film and liquid membranes of the present invention were loaded into an appropriate test cell, and evaluated for their permeation properties for ammonia and nitrogen.

All membrane experiments were performed using a specially-constructed membrane test cell. The membrane, in the form of a thin film, was supported between two stainless steel discs. A honeycomb arrangement of ⅛ diameter holes provided feed and permeate gas streams with access to the membrane. The exposed or "active" membrane surface area was 1.3 $cm^2$. In some experiments a thin sheet of woven stainless steel mesh (Pall Corp., Cortland, NY) was used for added mechanical support. The specific design and structure of the membrane test cell is not critical and any such cell can be employed which gives accurate permeation measurements.

The permeation properties of the membranes were evaluated using a standard type of permeation apparatus. Electronic mass flow controllers were used to blend a feed gas mixture which was passed over one surface of the membrane. The concentrations of permeate gases in a helium stream, passing over the other side of the membrane, were measured with a gas chromatograph (GC). The GC was equipped with a computer-controlled sampling device and a data reduction system such that the entire analysis was automated. The concentration of ammonia (in the permeate) was determined using a Chromosorb 103 column operated isothermally at 60° C.; permeant nitrogen, hydrogen and any adventitious oxygen were separated using a molecular sieve 5A column. As with the membrane test cell, the specific apparatus employed is not critical and any suitable system may be used.

B. Calculations and Data Presentation

The flux of a particular gas passing through the membrane is determined from its concentration in the controlled flow of helium which sweeps the permeate side of the membrane. Membrane performance is expressed in terms of the permeance ($\phi$) for each gas that passes through the membrane. This $\phi$ is defined as the experimental flux J, (cm$^3$ sec$^{-1}$), per unit area A (cm$^2$) of membrane surface and unit pressure differential $\Delta$P (cmHg) of the particular gas between the two interfaces of the membrane:

$$\phi = \frac{J}{A \cdot \Delta P} \text{ in units of cm}^3 \text{ (at STP)/cm}^2 \cdot \text{sec} \cdot \text{cmHg.}$$

For conventional polymer membranes, where Fick's Law and Henry's Law apply, the permeance is the ratio of the standard permeability, Po. of the material (expressed as cm$^3$.cm/cm$^2$.sec.cmHg) divided by the membrane thickness l (cm). In the following examples, results are expressed in terms of $\phi$ rather than Po, since the membrane thickness, because of the swelling in the presence of ammonia, is often not known (at least with any reasonable degree of precision).

The selectivity of the membrane, expressed as $\propto$(NH$_3$/H$_2$) and $\propto$(NH$_3$/N$_2$)), is given, by the ratio of the simultaneously measured permeance values of two gases. Because of the considerable swelling of the material that takes place with ammonia it would not be meaningful to express the selectivity by the ratio of the individually observed $\phi$NH$_3$ and $\phi$N$_2$. In addition, the presence of sorbed NH$_3$ changes the nature of the membrane considerably so that the permeance values measured independently, such as for NH$_3$ and N$_2$, would be of quite different materials. For these reasons, the gas transport properties of the membranes were always determined in the presence of NH$_3$.

The following examples are meant to illustrate the present invention and are not meant to be limiting.

EXAMPLE 1

Performance of an NH$_3$—NH$_4$SCN Liquid Membrane Imbibed in Porous Nylon

A membrane was prepared by soaking a porous nylon filter (Zetapore, AMF Corp., pore size 0.2$\mu$) in a saturated solution of NH$_4$SCN—NH$_3$ for one hour. The membrane was then removed from the solution and allowed to dry under N$_2$. A section was mounted in a membrane test cell using a Pt screen for support. The membrane was tested for the separation of ammonia from N$_2$ at 0° C. and 23° C. Results are given in Table I below.

While the above supported liquid membrane shows excellent NH$_3$/N$_2$ separation characteristics it cannot withstand high transmembrane pressures because of the likely loss of liquid by extrusion through the pores. However, this difficulty may be overcome by essentially encapsulating the liquid film within an NH$_3$ permeable (but non-selective) polymer or combination of polymers such that it cannot flow as a result of the applied pressure gradient. This may be done, for instance, by layering on each face of the above experimental nylon supported liquid membrane a film of poly(trimethylsilylpropyne) or silicone rubber (both of which are very permeable to NH$_3$, N$_2$ and H$_2$), such that the active NH$_4$SCN/NH$_3$(l) solution is held (encapsulated) within the voids of the porous polymer. The concept could also be applied to the preparation of a similarly encapsulated NH$_4$SCN/NH$_3$(l) solution membrane using a hollow fiber. Thus such a solution (or initially, solid NH$_4$SCN) would be contained within the pores of a porous wall hollow fiber. The interior and exterior surfaces of the hollow fiber would then be coated with a thin film of one of the above gas-permeable polymers such that each "element" of NH$_4$SCN/NH$_3$(l) is effectively encapsulated within the wall of the hollow fiber, there being an effective "conduction path" for the gases between the interior and exterior walls of the fiber.

EXAMPLE 2

Preparation and Performance of a Modified Polyvinylalcohol/Ammonium Thiocyanate Membrane Polyvinylalcohol was modified by reaction with methacrylic acid and crosslinking with tetraethylene glycol diacrylate by the following procedure.

A jacketed reaction vessel was charged with poly(vinylalcohol), (PVOH) (30 g), (APCI, VINOL-540, 88% hydrolyzed, Mn=88,000, Mw=150,000) swollen in H$_2$O to 9.5% solids. Methacrylic acid (MAA—acrylic monomer) (9 g) was added to the solution and mixing was begun. After about 30 minutes, 0.34 g of a tetraethylene glycol diacrylate (TEGDA—crosslinking agent), 0.056 g of ammonium persulfate (catalyst), 2.93 g of 30% aqueous NH$_3$ and 130 g of H$_2$O were added. The mixture was stirred at about 25° C. for an additional 2-3 hours. The final solution was 6.5% solids. Films, 80-200 $\mu$m thick, were prepared by evaporating the solution to near dryness under flowing nitrogen at 25° C. The crosslinking reaction was initiated by heating the nearly dry film to 65° C. for 4-5 hours.

Ammonium thiocyanate was incorporated into the above polymeric network by adding the crystalline salt, in approximately a 1:1 salt/polymer solids (wt) ratio, to the PVOH-MAA-TEGDA solution. A film was then prepared as above.

The test membrane was prepared as follows. The film of 1:1 modified PVOH/NH$_4$SCN, about 200 $\mu$m in

TABLE I

| | PERFORMANCE OF AN NH$_4$SCN—NH$_3$ LIQUID MEMBRANE IMMOBILIZED IN POROUS NYLON | | | | | |
|---|---|---|---|---|---|---|
| | FEED GAS FLOW: 20 SSCM | | PERMEATE GAS He FLOW: 20 SCCM | | PERMEANCE | |
| TEMP (°C.) | $P$(NH$_3$) (kPa) | $P$(N$_2$) (kPa) | $P$(TOTAL) (kPa) | VOL % NH$_3$ | $\phi$(NH$_3$) (cm$^3$/cm$^2$ · s · cmHg) | SELECTIVITY $\propto$(NH$_3$/N$_2$)* |
| 0 | 134 | 134 | 359 | 7.6 | 2.4 × 10$^{-3}$ | >1000 |
| 23 | 134 | 134 | 358 | 6.1 | 1.9 × 10$^{-3}$ | 8700 |

*Corrected for background air.

thickness, sandwiched between sheets of porous Teflon (Goretex ®) was supported on a grid of polypropylene (Microfiltration Systems, Dublin, CA) for added mechanical support. The composite was sealed in a cell area of 0.3 cm². As in the previous example a correction for background air was applied to the $\alpha(NH_3/N_2)$ selectivity values. Results are shown in Table II below.

TABLE II

| | PERFORMANCE OF A PVOH/NH4SCN MEMBRANE | | | | | |
|---|---|---|---|---|---|---|
| | FEED GAS FLOW: 20 SSCM | | PERMEATE GAS He FLOW: 20 SCCM | | PERMEANCE | SELECTIVITY |
| TEMP (°C.) | $P(NH_3)$ (kPa) | $P(N_2)$ (kPa) | $P(TOTAL)$ (kPa) | VOL % $NH_3$ | $\phi(NH_3)$ cm³/cm² · s · cmHg | $\alpha(NH_3/N_2)$ |
| 0 | 184 | 184 | 362 | 2.27 | $1.83 \times 10^{-4}$ | >3000 |
| 19 | 185 | 185 | 362 | 2.15 | $1.79 \times 10^{-4}$ | 3000 |
| 50 | 180 | 180 | 356 | 2.14 | $1.80 \times 10^{-4}$ | 1000 |

EXAMPLE 3

(Comparative) Performance of a Modified Polyvinlyalcohol Membrane (without added NH4SCN) for the Separation of Ammonia from Nitrogen A PVOH-MAA-TEODA copolymer was prepared as in Example 2. No NH4SCN was added. The solution was dried under nitrogen to produce a film of ≈0.05 cm in thickness. At 26° C., the ammonia permeability was 219 Barriers, while the permeability to $N_2$ was 70, thus the $NH_3/N_2$ selectivity of this polymer, without added NH4SCN, was about 3. The Example shows that the addition of NH4SCN is essential for the preparation of an effective ammonia-separation membrane.

Having thus described the present invention, what is now deemed appropriate for Letters Patent is set out in the following appended claims.

What is claimed is:

1. A process for separating ammonia from a mixture of gases containing ammonia and at least one other component, the process comprising: contacting said ammonia-containing mixture with a membrane containing a salt having the structural formula:

$$NR_4^+ X^-$$

wherein each R is independently H or a straight chain or branched alkyl group and $X^-$ is an organic or inorganic anion, such that said membrane selectively permeates ammonia from the ammonia-containing mixture.

2. A process in accordance with claim 1 wherein $X^-$ is selected from the group consisting of $Cl^-$, $Br^-$, $I^-$, $TeCN^-$, $SeCN^-$, $NO_3^-$ and $SCN^-$ and carboxylate $R'CO_2^-$ where $R'=H$ or an alkyl hydrocarbon.

3. A process in accordance with claim 1 wherein at least one R is H and said salt is incorporated into a polymeric structure to form a physical mixture which functions as a membrane.

4. A process in accordance with claim 3 wherein said polymeric structure is polyvinylalcohol.

5. A process in accordance with claim 4 wherein said polyvinylalcohol has been functionalized with methacrylic acid and cross-linked with tetraethylene glycol diacrylate prior to incorporating the salt.

6. A process in accordance with claim 1 wherein each R is H and said salt is incorporated into a polymeric structure to form a physical mixture which functions as a membrane.

7. A process in accordance with claim 6 wherein the said physical mixture comprising the salt is utilized as a thin film on a suitable support, or is immobilized in a thin porous support.

8. A process in accordance with claim 7 wherein the said physical mixture either as a thin film or an immobilized liquid is encapsulated in non-porous, gas permeable polymer or polymer blend material.

9. A process in accordance with claim 1 wherein said salt is ammonium thiocyanate.

10. A process in accordance with claim 1 wherein a solution of said salt in liquid $NH_3$ is utilized as a thin film on a suitable support, or is immobilized in a thin porous support.

11. A process in accordance with claim 10 wherein each R is H.

12. A process in accordance with claim 10 wherein the solution of the salt in liquid $NH_3$, either as a thin film or as an immobilized liquid, is encapsulated in a non-porous, gas permeable polymer or polymer blend material.

13. A process in accordance with claim 1 wherein ammonia is separated from ammonia synthesis plant recycle loop gas comprising $NH_3$, $N_2$, $H_2$, $CH_4$ and Ar.

14. A process in accordance with claim 1 wherein said salt is encapsulated in a non-porous, gas permeable polymer or polymer blend material.

15. A process of claim 1 where the membrane may be in the configuration of a flat sheet, spiral wound sheet or hollow fiber.

* * * * *